US012683969B2

(12) United States Patent
Shin

(10) Patent No.: US 12,683,969 B2
(45) Date of Patent: Jul. 14, 2026

(54) MACHINE-LEARNED VERIFICATION PIPELINE FOR SENSOR INPUTS

(71) Applicant: Google LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 485 days.

(21) Appl. No.: 18/013,426

(22) PCT Filed: Dec. 22, 2022

(86) PCT No.: PCT/US2022/053821

§ 371 (c)(1),
(2) Date: Dec. 28, 2022

(87) PCT Pub. No.: WO2024/136863

PCT Pub. Date: Jun. 27, 2024

(65) Prior Publication Data

US 2025/0126124 A1 Apr. 17, 2025

(51) Int. Cl.
H04L 9/40 (2022.01)

(52) U.S. Cl.
CPC .................................. H04L 63/102 (2013.01)

(58) Field of Classification Search
CPC ...... G06F 3/0482; G06F 21/32; G06F 21/316; G06F 21/6254; G06F 16/235; G06F 21/45; G06F 1/163; G06F 18/23213; G06F 21/604; G06Q 20/145; G06Q 20/1085; G06Q 20/3229; G06Q 20/4016; G06Q 50/265; G06N 20/00; G06N 7/01;

H04L 51/04; H04L 63/0861; H04L 63/1425; A61B 5/72767; G06V 20/62; G06V 40/70; H04W 12/033
See application file for complete search history.

(56) References Cited

U.S. PATENT DOCUMENTS

| | | | | |
|---|---|---|---|---|
| 10,257,181 | B1* | 4/2019 | Sherif | G06F 21/45 |
| 10,270,808 | B1* | 4/2019 | Sherif | G06Q 50/265 |
| 10,924,514 | B1* | 2/2021 | Altman | G06N 7/01 |
| 2018/0006989 | A1* | 1/2018 | Dotan-Cohen | H04L 51/04 |
| 2018/0082304 | A1* | 3/2018 | Summerlin | G06Q 20/3229 |
| 2018/0295146 | A1* | 10/2018 | Kovega | H04L 63/1425 |
| 2018/0336286 | A1* | 11/2018 | Shah | G06F 1/163 |

(Continued)

OTHER PUBLICATIONS

Angulo et al., "Exploring Touch-Screen Biometrics for User Identification on Smart Phones.", International Federation for Information Processing Advances in Information and Communication Technology, vol. 375, Jan. 1, 2012, pp. 130-143.

(Continued)

*Primary Examiner* — Dustin Nguyen
(74) *Attorney, Agent, or Firm* — DORITY & MANNING P.A.

(57) ABSTRACT

An example method is provided. Unverified interaction data descriptive of interactions of a user with the computing device can be obtained. Feature values that embed characteristics of the unverified interaction data can be generated using a machine-learned embedding network of a machine-learned verification pipeline. A user account associated with the unverified interaction data can be determined using a verification model of the machine-learned verification pipeline.

21 Claims, 10 Drawing Sheets

(56) References Cited

U.S. PATENT DOCUMENTS

| | | | | |
|---|---|---|---|---|
| 2019/0356681 A1* | 11/2019 | Sandke | | H04L 63/1425 |
| 2020/0042773 A1* | 2/2020 | Benkreira | | G06V 20/62 |
| 2021/0081920 A1* | 3/2021 | Spina | | G06N 20/00 |
| 2021/0182370 A1 | 6/2021 | Melnikov et al. | | |
| 2021/0192078 A1* | 6/2021 | Cosman | | G06F 21/6254 |
| 2021/0211517 A1* | 7/2021 | Albero | | G06F 16/235 |
| 2021/0350346 A1* | 11/2021 | Edwards | | G06Q 20/1085 |
| 2021/0382586 A1* | 12/2021 | Bielby | | G06F 3/0482 |
| 2021/0406353 A1* | 12/2021 | Li | | G06V 40/70 |
| 2022/0029981 A1* | 1/2022 | Mavani | | H04L 63/0861 |
| 2022/0051125 A1* | 2/2022 | Ho | | G06F 18/23213 |
| 2022/0114594 A1* | 4/2022 | Nunes | | G06Q 20/4016 |
| 2022/0201008 A1* | 6/2022 | Stergioudis | | H04L 63/1425 |
| 2023/0119939 A1* | 4/2023 | Agmon | | G06F 21/32 |
| | | | | 726/18 |
| 2023/0123643 A1* | 4/2023 | Fomenko | | H04W 12/033 |
| | | | | 713/159 |
| 2023/0209116 A1* | 6/2023 | Leung | | G06Q 20/145 |
| | | | | 725/5 |
| 2023/0397888 A1* | 12/2023 | Golan | | A61B 5/7267 |
| 2024/0086569 A1* | 3/2024 | Landy | | G06F 21/604 |
| 2024/0095330 A1* | 3/2024 | Mossoba | | G06F 21/316 |

OTHER PUBLICATIONS

Cheng et al., "Identifying Child Users via Touchscreen Interactions.", Association for Computing Machinery Transactions on Sensor Networks, vol. 16, Issue 4, Article No. 35, Jul. 28, 2020, 25 pages.

Feng et al., "Tips: Context-Aware Implicit User Identification using Touch Screen in Uncontrolled Environments.", Fifteenth Workshop on Mobile Computing Systems and Applications, Santa Barbara, California, United States, Article No. 9, Feb. 26-27, 2014, pp. 1-6.

Lefyer et al., "Method of Person Identification Based on Biometric Characteristics of Touch Screen Gestures.", Twentieth Conference of Open Innovations Association (FRUCT), St. Petersburg, Russia, Apr. 3-7, 2017, pp. 222-227.

Tybura et al., "Touch Screen Based User Identification.", Measurement Automation Monitoring, Dec. 2015, vol. 61, No. 12, pp. 565-567.

International Search Report and Written Opinion for PCT/US2022/053821, mailed on Jul. 10, 2023, 11 pages.

International Preliminary Report on Patentability for Application No. PCT/US2022/053821, mailed Jul. 3, 2025, 6 pages.

\* cited by examiner

500

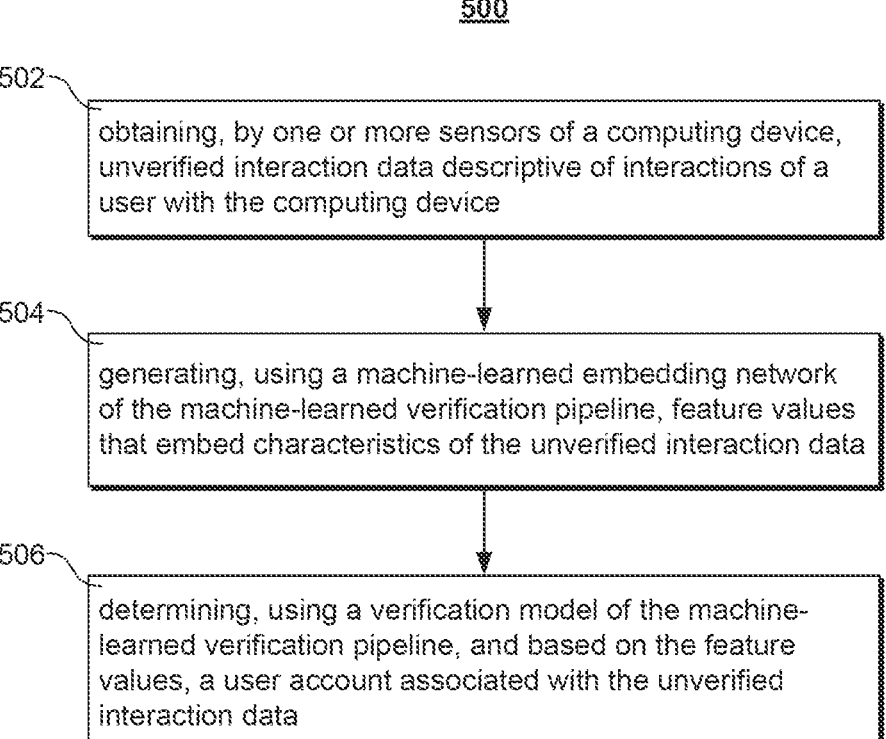

502 — obtaining, by one or more sensors of a computing device, unverified interaction data descriptive of interactions of a user with the computing device 504 — generating, using a machine-learned embedding network of the machine-learned verification pipeline, feature values that embed characteristics of the unverified interaction data 506 — determining, using a verification model of the machine-learned verification pipeline, and based on the feature values, a user account associated with the unverified interaction data

Figure 5

MACHINE-LEARNED VERIFICATION PIPELINE FOR SENSOR INPUTS

PRIORITY CLAIM

This application is based upon and claims the right of priority under 35 U.S.C. § 371 to International Application No. PCT/US2022/053821, filed on Dec. 22, 2022. International Application No. PCT/US2022/053821 is hereby incorporated by reference herein in its entirety.

FIELD

The present disclosure relates generally to machine-learned verification techniques. More particularly, the present disclosure relates to training and implementing machine-learned models to verify sensor inputs.

BACKGROUND

User devices can store data and provide functionality for users of the devices. Multiple users can engage with a user device. Some users may be authorized, some users may be unauthorized. Among authorized users, some may have different configuration preferences than others.

SUMMARY

Aspects and advantages of embodiments of the present disclosure will be set forth in part in the following description, or can be learned from the description, or can be learned through practice of the embodiments.

In an example aspect, the present disclosure provides an example computer-implemented method for verification of sensor inputs with a machine-learned verification pipeline. The example method can include obtaining, by one or more sensors of a computing device, unverified interaction data descriptive of interactions of a user with the computing device. The example method can include generating, using a machine-learned embedding network of the machine-learned verification pipeline, feature values that embed characteristics of the unverified interaction data. The example method can include determining, using a verification model of the machine-learned verification pipeline, and based on the feature values, a user account associated with the unverified interaction data.

In an example aspect, the present disclosure provides an example memory device including one or more non-transitory computer-readable media storing instructions that are executable to cause one or more processors to perform example operations. The example operations can include obtaining, by one or more sensors of a computing device, unverified interaction data descriptive of interactions of a user with the computing device. The example operations can include generating, using a machine-learned embedding network of the machine-learned verification pipeline, feature values that embed characteristics of the unverified interaction data. The example operations can include determining, using a verification model of the machine-learned verification pipeline, and based on the feature values, a user account associated with the unverified interaction data.

In an example aspect, the present disclosure provides an example computing system comprising one or more processors and a memory device including one or more non-transitory computer-readable media storing instructions that are executable to cause one or more processors to perform example operations. The example operations can include obtaining, by one or more sensors of a computing device, unverified interaction data descriptive of interactions of a user with the computing device. The example operations can include generating, using a machine-learned embedding network of the machine-learned verification pipeline, feature values that embed characteristics of the unverified interaction data. The example operations can include determining, using a verification model of the machine-learned verification pipeline, and based on the feature values, a user account associated with the unverified interaction data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 is a flow chart diagram of an example method for implementing an example verification pipeline according to example aspects of some embodiments of the present disclosure.

Figure 1A:
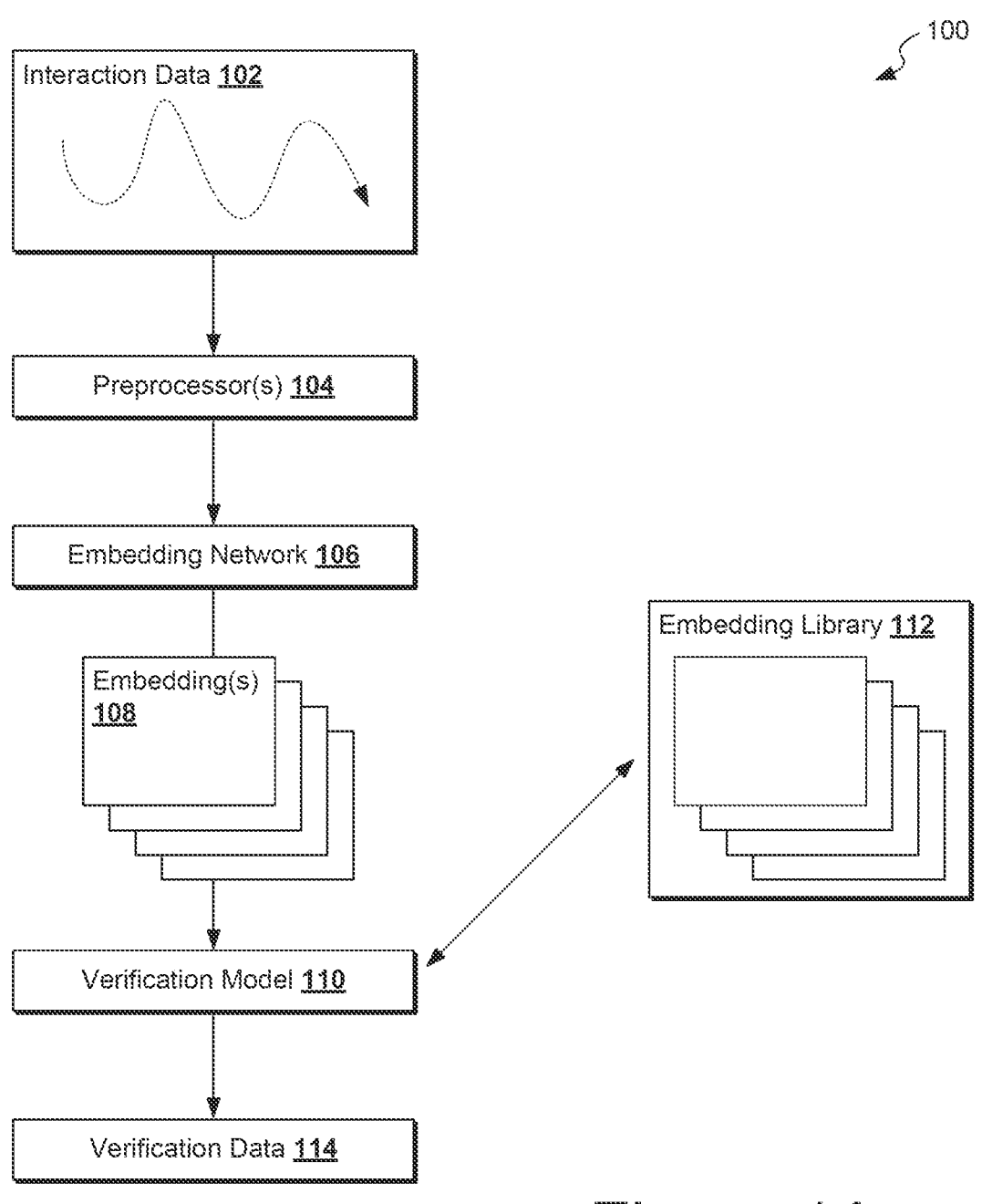
FIG. 1A is a block diagram of an example verification pipeline according to example aspects of some embodiments of the present disclosure.

Reference numerals that are repeated across plural figures are intended to identify the same features in various implementations.

DETAILED DESCRIPTION

The present disclosure generally relates to a machine-learned verification architecture to process sensor inputs from a computing device during a user session and determine a user account associated with the session. Some computing devices can be communal or shared devices, such as a television, smart appliance, etc. in a multi-person household. Even for some computing devices that can be explicitly associated with a single user (e.g., a personal mobile phone), the primary user may let other persons borrow the device to perform various tasks. Advantageously, techniques according to the present disclosure can facilitate adaptation and personalization of the computing device experience for different users. Techniques according to the present disclosure can do so even, in some cases, without requiring explicit confirmation from the specific user of their account.

For example, example aspects of embodiments presented in the present disclosure can implement a machine-learned verification pipeline. The machine-learned verification pipeline can include a machine-learned feature extraction model configured to receive sensor data describing user interactions (e.g., user inputs) and extract features that embed meaningful cues from the sensor data that can be used to differentiate among user accounts. The machine-learned verification pipeline can include a verification model that can process the extracted feature values to generate an association between the user interactions and a user account. Based on this association, the user experience can be customized, secured, etc.

Some prior approaches have relied on hand-crafted heuristics or fitted models to compare touch inputs to prior touch inputs. But such techniques are heavily reliant on manual fitting and tuning, and often fail to provide an architecture that can generalize and adapt to new users and use cases and can often fail to achieve sufficient accuracy and seamless reliability for practical applications.

In contrast, example machine-learned verification pipelines according to example aspects of the present disclosure can provide for improved generalization and adaptation as well as providing for scalability for deployment in practical applications. Furthermore, example machine-learned verification pipelines according to example aspects of the present disclosure can provide for online learning to automatically refine and improve its performance over time as it is used.

Example aspects of the present disclosure can provide a number of technical effects and benefits. In one example aspect, the present disclosure can provide for improved device security by verifying access to hardware and data associated with a given user account. For instance, example implementations can facilitate background verification and re-verification to corroborate, supplement, or replace traditional explicit sign-on techniques. Hardware and data security can thereby be improved with little or no extra friction in the user experience, thereby freeing user interface real estate and processing for performing other tasks. The machine-learned pipeline, for example, can provide for improved accuracy, and adaptation over time to maintain accuracy, thereby improving real-world outcomes in practical implementations.

In one example aspect, the present disclosure can provide for improved efficiency of operations performed on computing devices. By leveraging machine-learned verification pipelines according to the present disclosure, example computing devices can provide personalized services and user experiences without requiring an explicit sign-on operation for each session. In this manner, for instance, electrical and computational resources can be more efficiently allocated to performing a given task of the user in lieu of the explicit sign-on operation. Furthermore, the interface of the computing device can be configured to directly engage with a desired task instead of interrupting the task flow with an explicit sign-on for every session.

In one example aspect, the present disclosure can provide for improved capabilities for shared computing devices. For instance, example machine-learned verification pipelines according to the present disclosure can facilitate adaptation of a given computing device to a particular user based on recognizing an account associated with that user. Advantageously, this can be performed in real time as the user interacts with the computing device. As other users also interact with the computing device, the computing device can adapt and personalize in real time to the user. In this manner, for instance, example machine-learned verification pipelines can unlock previously unrealized capabilities of computing devices to provide custom and personalized experiences in a shared-device environment.

Example aspects of the present disclosure are discussed herein in reference to the enclosed figures.

FIGS. 1A-IC are block diagrams of an example machine-learned verification pipeline 100 according to the present disclosure. FIG. 1A illustrates an example data flow for a runtime implementation. Interaction data 102 can include or be based on sensor data from one or more user devices. Preprocessors 104 can process interaction data 102 to shape or condition interaction data 102 for input to embedding network 106. Embedding network 106 can generate one or more embeddings 108 based on the interaction data 102. Embedding(s) 108 can be input to a verification model 110 which, optionally by reference to embedding library 112, can determine verification data 114 associated with the interaction data 102. For instance, verification data 114 can include verification that interaction data 102 is associated with a particular user account.

Interaction data 102 can include or be based on substantially any type of data indicative of interactions with a user device. Interaction data 102 can include sensor data. Sensor data can be obtained from touch sensors, physical buttons, inertial measurement units, etc. Interaction data can be timestamped to track time values (relative or absolute) associated with respective input values. Interaction data 102 can include data describing a location and timing of user inputs entered with an input sensor for an input interface (e.g., a touch screen, keyboard, touchpad, etc.).

Interaction data 102 can be verified. Verified interaction data can include interactions that are explicitly associated with a particular user account or otherwise associated with a high confidence level. Verified interaction data can include interactions occurring shortly after an explicit sign-in event or other confirmation of a user account. Interaction data can be explicitly verified or confirmed after occurrence, such as interactions occurring prior to a request or prompt that solicits confirmation that the interactions corresponded to a particular user account.

Interaction data 102 can be unverified. Unverified interaction data can include interactions which are not associated with any particular user account. Unverified interaction data can include interactions with a device that has previously been associated with a particular user account (or multiple user accounts) but certain verification criteria are not met. Unverified interaction data can include interactions with a device that was associated with a particular user account over a threshold time interval prior to a time of the interactions. For instance, verifications can grow stale, such that the verification of a first set of interactions is not necessarily inherited by a subsequent second set of interactions.

Interaction data 102 can be privatized. Interaction data 102 can be noised. Interaction data 102 can be noised to satisfy a differential privacy criterion. Interaction data 102 can be noised by injecting Gaussian noise or other values according to respective distributions. Interaction data 102 can be noised by translating, transposing, or otherwise shifting or manipulating the underlying inputs to obscure the raw inputs. Interaction data 102 can be noised by injecting temporal noise to obscure the underlying sequences of the raw inputs.

Preprocessors 104 can receive and process interaction data 102. Interaction data 102 can be obtained from a variety of sources, including a number of different sensors, applications, firmware interfaces, etc. that may have varied output formats, resolutions, etc. Interaction data 102 can include low-level hardware readings, and preprocessors 104 can convert the raw data to a desired format for further processing downstream (e.g., algebra-compatible numerical representations).

Preprocessors 104 can regulate the structure of the interaction data 102 for further processing in the pipeline 100. For instance, preprocessors 104 can down/upsample data to a desired data rate. Preprocessors 104 can shape data and merge data from different sources.

Preprocessors 104 can shape interaction data 102 into a multidimensional format. A multidimensional format can include values for multiple input dimensions. Input dimensions can include time, location of input on a first axis (e.g., horizontal axis), location of input on a second axis (e.g., vertical axis), etc. A multidimensional input format can include an input volume (e.g., two-dimensional coordinates over time). One or more dimensions can include time channel(s) (e.g., recording one or more times of input at a location), a velocity value (e.g., a velocity of input at that location for the one or more times), an acceleration value (e.g., an acceleration of input at that location for the one or more times), a pressure value (e.g., a pressure of input at that location for the one or more times), etc. Other dimensions can include dimensions for inertial measurement data optionally indexed according to the time(s) of measurement or in association with other spatially indexed inputs.

Preprocessors 104 can shape interaction data 102 into an image-based format. Preprocessors 104 can transform interaction data 102 into an optionally multichannel map of inputs. An input interface can include a display, and the map can chart the location(s) of inputs over the display area. One or more channels of the map can include time channel(s) (e.g., recording one or more times of input at that location), a velocity value (e.g., a velocity of input at that location for the one or more times), an acceleration value (e.g., an acceleration of input at that location for the one or more times), a pressure value (e.g., a pressure of input at that location for the one or more times), etc. Other channels can include channels for inertial measurement data optionally indexed according to the time(s) of measurement or in association with other spatially indexed inputs.

Preprocessors 104 can shape interaction data 102 into a tabular format. Preprocessors 104 can transform interaction data 102 into a sequence of rows that each contain one or more coordinates of an input location, inertial values, etc. in association with a time value. Preprocessors 104 can tokenize interaction data 102 for processing by, for example, a transformer model. Tokenized interaction data can include token(s) for the values associated with a given input measurement. Tokenized interaction data can include learnable position token(s) for processing tokenized interaction data with sequence-based attention over the ordering of inputs recorded in interaction data 102.

Preprocessors 104 can interpolate sensor data to merge into a shared resolution framework. Time values can correspond to an actual time of measurement of the sensor value. The time values can be selected by the system based on a desired interval. If the time values selected by the system do not align with the time stamps on the sensor data, preprocessors 104 can interpolate the sensor data to obtain values aligned with the time values selected by the system.

Preprocessors 104 can parse interaction data 102 to determine one or more discrete interaction events within interaction data 102. A discrete interaction event can include a contiguous sequence of interactions that are related (e.g., part of one gesture). A discrete interaction event can be bounded by one or more null inputs. Null inputs can be injected to separate interaction data 102 into a sequence of discrete interaction events. One or more clustering algorithms can be applied to cluster interaction data 102 into clusters of discrete interaction events.

Embedding network 106 can process the interaction data 102 (e.g., optionally after being pre-processed by preprocessors 104) to generate embedding(s) 108. Embedding network 106 can include one or more machine-learned neural networks or models. Embedding network 106 can include one or more image processing models to perform image-based processing of the interaction data 102 (e.g., operating over one or more image frames of interaction data 102, such as in a batch of frames). Embedding network 106 can include one or more sequence-based processing models to perform sequence-based processing of the interaction data 102. Embedding network 106 can include one or more convolutional neural networks, transformer models, recurrent neural networks, multilayer perceptions, encoders, autoencoders, decoders, etc. configured to receive interaction data 102 and output embedding(s) 108.

Embedding network 106 can encode the received inputs into a latent embedding in a latent feature space. The latent feature space can provide a low-dimensional embedding of comparatively high-dimensional inputs.

Embedding network 106 can receive one or more inputs at a time. Embedding network 106 can operate on a rolling buffer of inputs. For instance, an image frame of interaction data 102 can represent a 1-second snapshot of interactions with a device. Multiple image frames can be collected in a buffer. As new frames are added, older frames can leave the buffer. Embedding network 106 can operate on the image frames in the buffer, such that embedding(s) 108 represent multiple interaction snapshots over time. This can provide smoothing of the embeddings 108 over diverse interaction data 102.

Embedding(s) 108 can include feature vectors in a latent feature space. An embedding 108 can correspond to a discrete interaction event. Multiple embeddings 108 can correspond to multiple discrete interaction events. Multiple embeddings 108 can be computed for a contiguous sequence of interaction data 102 by windowing interaction data 102 (e.g., by sliding a window of observation over a time history of interaction data 102).

Verification model(s) 110 can process one or more embedding(s) 108 to generate verification data 114. Verification model(s) 110 can include machine-learned models that predict verification data 114 from input embedding(s) 108. Verification model(s) 110 can use embedding(s) 108 to index user account identifiers, such that a given embedding 108 can point to and retrieve a user account associated with the embedding 108. Verification model(s) 110 can cluster embedding(s) 108 such that new embedding(s) 108 can be compared to previously-computed embedding(s) 108 and can be associated with a prior cluster.

Verification model(s) 110 can include heuristic or decision tree models that can compare embedding(s) 108 to one or more embeddings in embedding library 112. Verification model(s) 110 can compute a similarity or distance between embedding(s) 108 and embedding library 112. Verification model(s) 110 can compute a similarity or distance between embedding(s) 108 and a centroid of a cluster of embedding(s) in library 112. Verification model(s) 110 can compute a similarity or distance between embedding(s) 108 and a respective representative embedding associated with a respective cluster of embeddings in library 112. Verification model(s) 110 can compute a similarity or distance between embedding(s) 108 and a respective representative embedding associated with a respective user account.

Embedding library 112 can contain one or more pairings of embedded values associated with user account identifiers. Embedding library 112 can form a reference set of embeddings against which embedding(s) 108 can be compared. Embedding library 112 can include clusters of embeddings. One or more embeddings (e.g., in a cluster) can be associated with a user account. One or more embeddings (e.g., in a cluster) can be associated with a cluster identifier. A cluster identifier can be obtained in lieu of a user account identifier.

Embedded library 112 can be privatized. Interactions between verification model 110 and embedding library 112 can use one or more hashing operations to perform double-blind comparisons of the embeddings (e.g., homomorphic hashing). Various techniques for secure multi-party computation can be employed, including private data sketches, hashes, bloom filters, and the like.

Embedding library 112 can contain prior-computed embeddings associated with a same or associated user device. Verification models 110 can thus perform a reduced-scope matching exercise and evaluate embedding(s) 108 for matches within a set based on previously-observed embedding(s). For instance, at a first time, first embedding(s) 108 can be generated based on interaction data 102 from a first device. First embedding(s) 108 can be confirmed to be associated with a given user account. At a second time, second embedding(s) 108 can be generated based on interaction data 102 from the same first device. Second embedding(s) 108 can be verified by comparison to a library (or portion of a library) of verified or unverified embedding(s) 108 (or clusters thereof) associated with that first device (e.g., associated with other device(s) that relate to a user account of one or more user accounts associated with the first device).

Embedding library 112 can contain prior-computed embeddings associated with a different user device. For instance, at a first time, first embedding(s) 108 can be generated based on interaction data 102 from a first device. First embedding(s) 108 can be confirmed to be associated with a given user account. At a second time, second embedding(s) 108 can be generated based on interaction data 102 from a second device. Second embedding(s) 108 can be verified by comparison to a library (or portion of a library) of verified or unverified embedding(s) 108 (or clusters thereof) associated with the first device (e.g., associated with other device(s) that relate to a user account of one or more user accounts associated with the first device).

Verification data 114 can indicate a verification state. The verification state can indicate that interaction data 102 has been verified as associated with a particular user account or a cluster identifier or other indication of association with a prior user session. The verification state can indicate that interaction data 102 has not been verified as associated with a particular user account. The verification state can indicate that interaction data 102 has been verified as not associated with a particular user account.

Verification data 114 can indicate a confidence value associated with a verification state. Verification data 114 can indicate a confidence value that indicates a confidence with which verification model 110 has determined match or alignment between embedding(s) 108 and one or more reference embedding(s) in embedding library 112. The confidence value can be based on the distance between embedding(s) 108 and the one or more reference embedding(s) in embedding library 112. The confidence value can be based on a quantity or quality of one or more reference embedding(s) in embedding library 112.

User accounts can be accounts associated with a service provider. User accounts can be accounts associated with a particular device or group of devices. User accounts can be locally defined or exist over an ecosystem of services or devices.

A computing device (e.g., a user device, a server device) can provide personalization or customization based on verification data 114. A computing device can personalize an interface based on prior customization requests (e.g., load prior configuration settings of the user device) associated with the verified user account or verified cluster identifier. The computing device can perform actions based on an expected routine or sequence of operations associated with the verified user account or verified cluster identifier. The computing device can recommend content, provide predictive text completion, calibrate an automated speech recognition model, adapt a natural language processing model, or substantially any other action based on, informed by, or triggered by verification data 114 associated with the verified user account or verified cluster identifier.

Figure 1B:
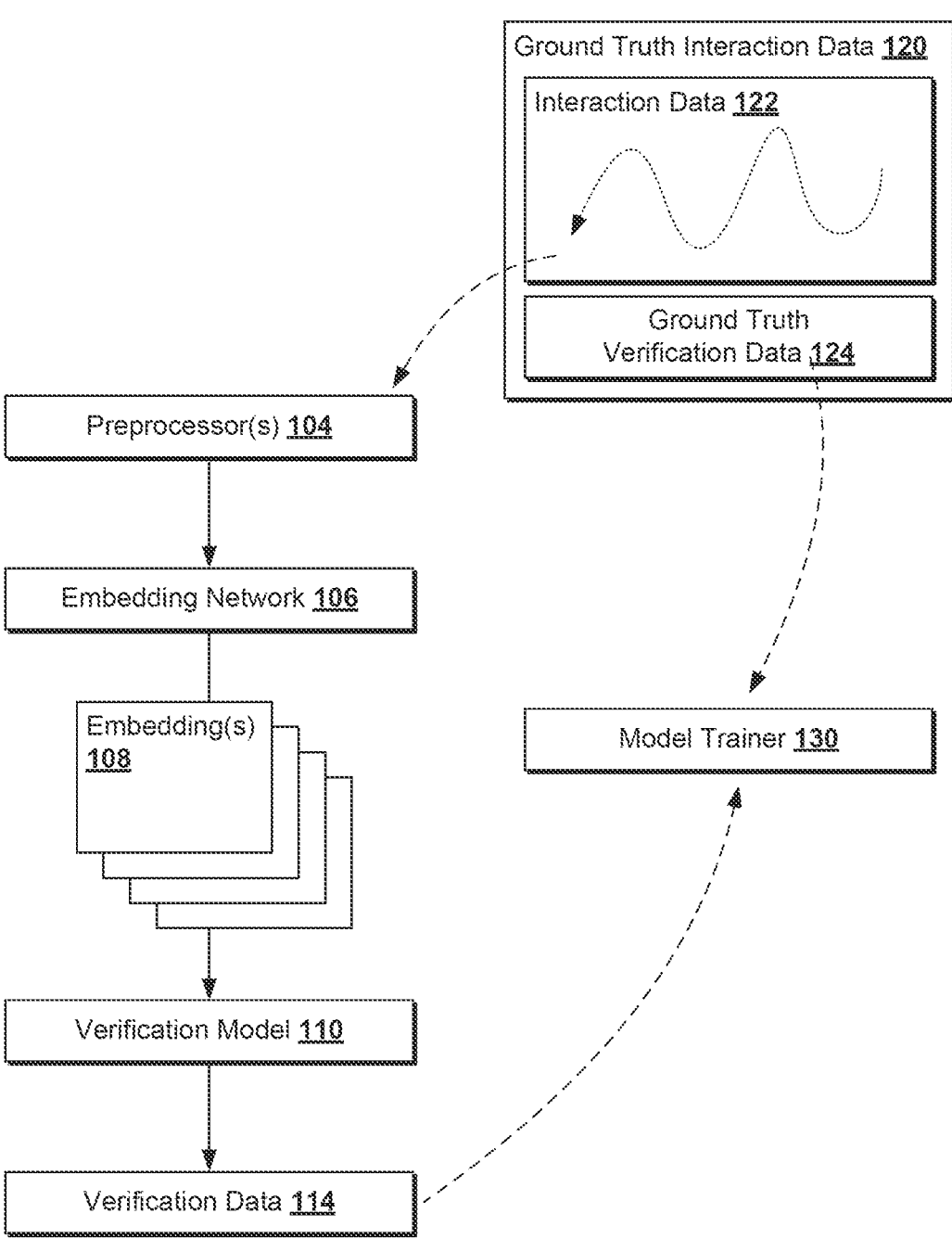
FIG. 1B is a block diagram of an example verification pipeline according to example aspects of some embodiments of the present disclosure.
Figure 1C:
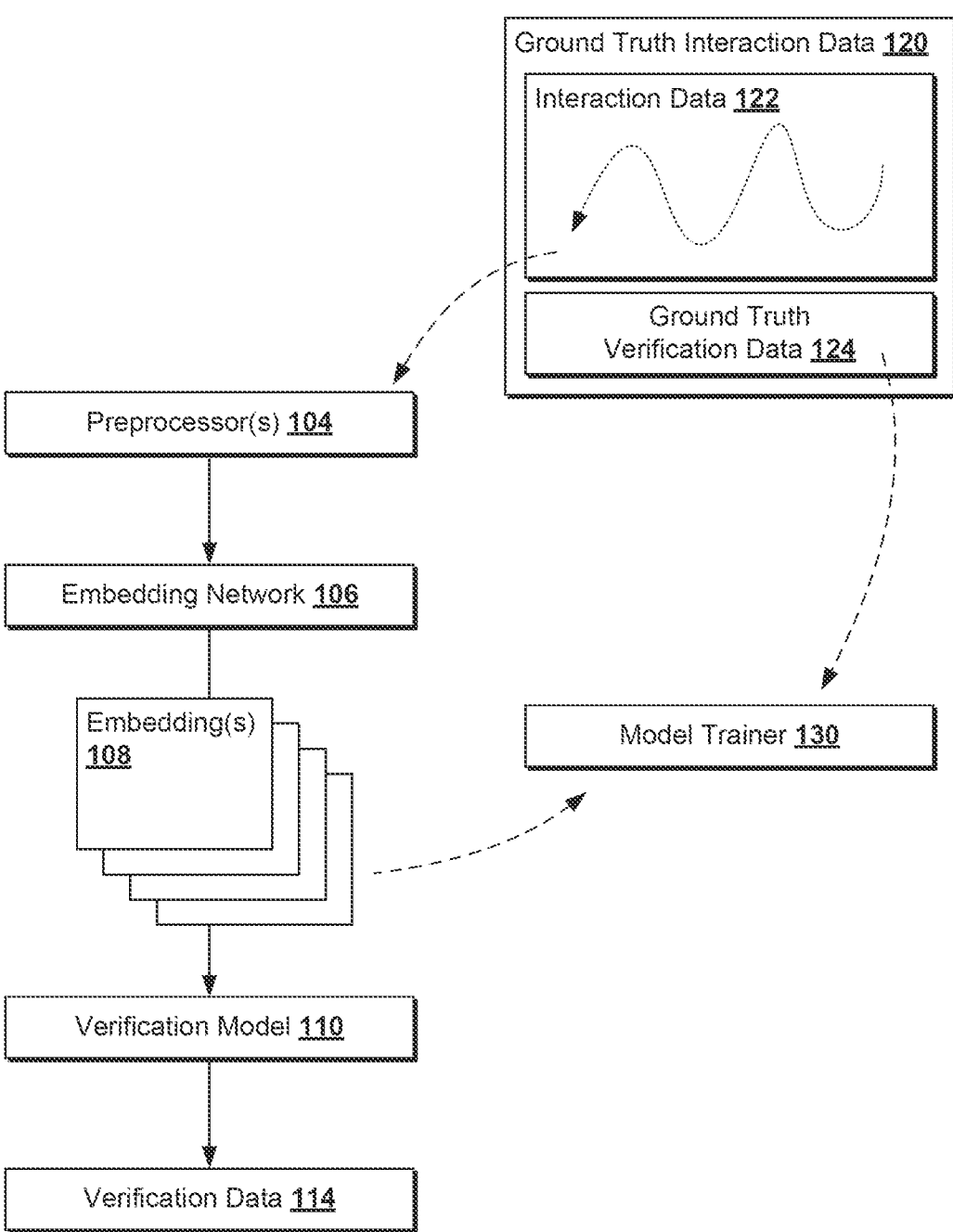
FIG. 1C is a block diagram of an example verification pipeline according to example aspects of some embodiments of the present disclosure.
Figure 1D:
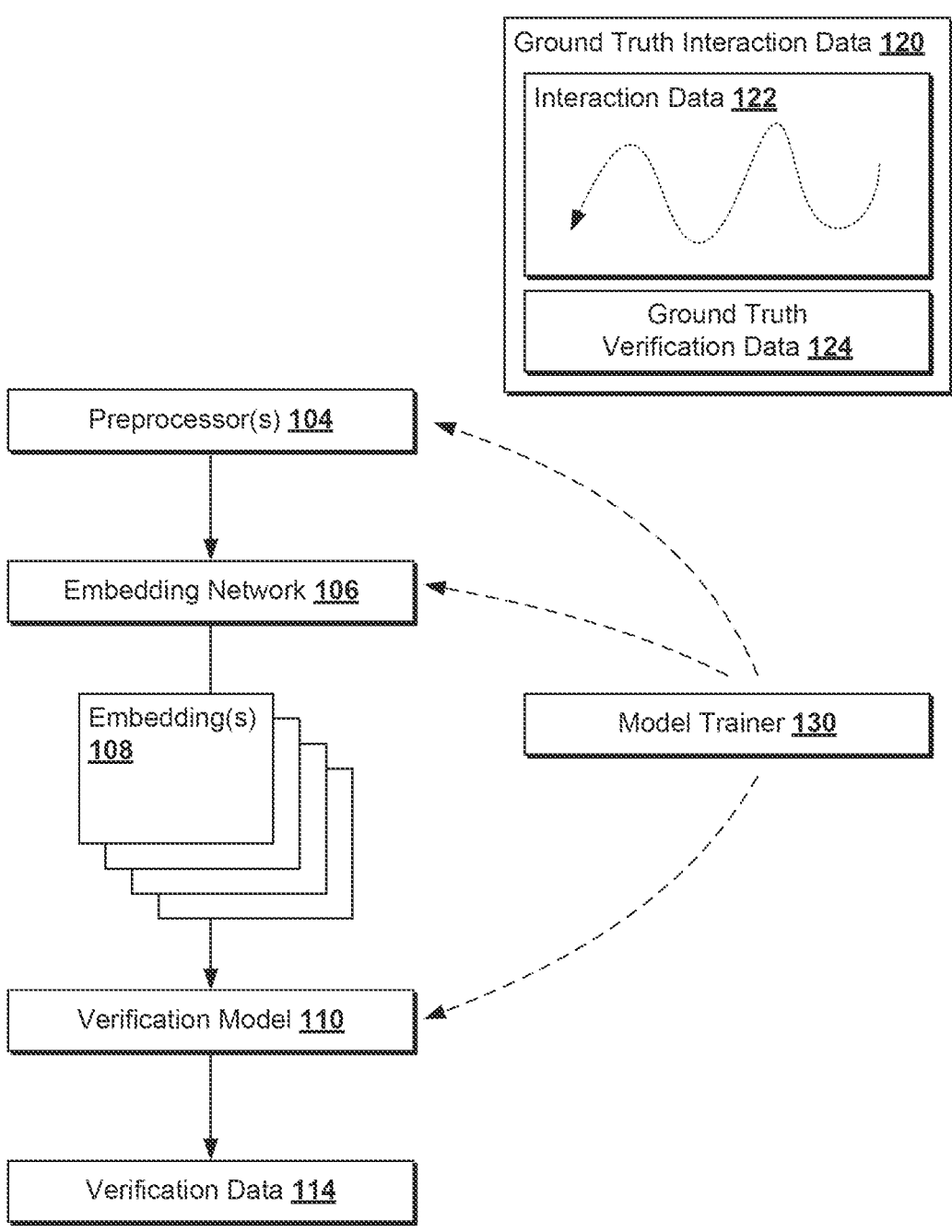
FIG. 1D is a block diagram of an example verification pipeline according to example aspects of some embodiments of the present disclosure.

FIGS. 1B, 1C, and 1D illustrate example data flows for example training iterations. Ground truth interaction data 120 can be used to supervise the performance of the pipeline. Ground truth interaction data 120 can include interaction data 122 that is associated with ground truth verification data 124.

As shown in FIG. 1B, interaction data 122 can be fed to the verification pipeline as a training example. Verification data 114 obtained from interaction data 122 can be compared with ground truth verification data 124 by model trainer 130. Model trainer 130 can compute a loss or other performance metric based on the comparison.

As shown in FIG. 1C, interaction data 122 can be fed to the verification pipeline as training examples. Ground truth verification data 124 can include labels indicating positive and negative examples of interaction data 122. Model trainer 130 can compute a loss or other performance metric based on the comparison of positive and negative examples (e.g., a contrastive loss, a triplet loss).

As shown in FIG. 1D, model trainer 130 can push updates back to the verification pipeline. For instance, model trainer 130 can provide updates to one or more parameters of at least one of preprocessor(s) 104, embedding network 106, or verification model 110. The loss can be backpropagated from verification data 114 through to preprocessor(s) 104 for end-to-end training of the verification pipeline.

Ground truth interaction data 120 can be obtained from one or more user devices. Interaction data 122 can be obtained from the same or different device(s) as interaction data 112. Interaction data 122 can be associated with the same or different user account(s) as interaction data 112.

Ground truth verification data 124 can include ground truth associations between interaction data 122 and one or more user account(s). Ground truth verification data 124 can be confirmed by a user who provides interaction data 122. For instance, a user device can prompt the user to confirm a user account identifier before, during, or after obtaining interaction data 122. Prompts can appear as notifications on a graphical user interface. Prompts can be included in an initialization or setup procedure for a new user account, a new device, a new sign-on for a user account that is new to the device.

Prompts can be automatically triggered by the system based on a performance tracker. The system can track a performance of the pipeline 100, such as by tracking a confidence level over time associated with verification data 114. If performance is below a threshold or goal, prompts can be triggered to obtain ground truth verification data for further refining and calibrating the embedding library 112 or one or more parameters of the machine-learned verification pipeline 100.

Ground truth verification data 124 can be confirmed by interactions on a first user device and used to train the verification pipeline for verifying interactions on a second user device. For instance, a first user device may not be shared (e.g., a personal mobile device) and be locked with a passcode. Interactions on that device can be associated with high confidence to a corresponding user account based on successful entry of the passcode. Thus interactions on that device can form part of ground truth interaction data 120, which can then be used to train the verification pipeline 100. The trained verification pipeline 100 can then be used to verify interactions on a second device. The second device can be associated with the first device (e.g., participates as part of a household of devices, signed on to the same local network, etc.).

Model trainer 130 can include a training component configured to update one or more learnable parameters of the machine-learned verification pipeline 100. Model trainer 130 can compute a loss or score to evaluate the performance of the machine-learned verification pipeline 100. Model trainer 130 can determine one or more updates to the machine-learned verification pipeline 100 based on the loss or score. Model trainer 130 can determine an effect of one or more parameters on the resultant loss or score (e.g., by determining a gradient at a parameter with respect to the loss or score, such as by backpropagating a gradient, etc.). Model trainer 130 can update the parameter(s) to improve the loss or score.

Model trainer 130 can compute a loss based on the output verification data 114. Model trainer 130 can compute a loss based on the accuracy of the verification state assigned to the ground truth interaction data 122. Model trainer 130 can compute a loss by comparing verification data 114 against ground truth verification data 124.

Model trainer 130 can compute a loss based on embedding(s) 108. Model trainer 130 can compute a contrastive loss or a triplet loss. Model trainer 130 can compute a loss configured for increasing a distance between embeddings generated for interactions for different user accounts. Model trainer 130 can compute a loss configured to decrease a distance between embeddings generated for interactions for the same user account.

The machine-learned verification pipeline 100 can be trained using unsupervised training (e.g., in addition to or in alternative to supervised training). For instance, the verification pipeline 100 can implement unsupervised learning by learning clusters of embeddings. Clusters of embeddings can be predicted to be associated with a common user account (e.g., the identifier of which may or may not be known).

The machine-learned verification pipeline 100 can be trained using federated learning. For instance, the machine-learned embedding network 106 can be trained at least partially by obtaining updated model parameters from a server. The server can obtain the updated model parameters by aggregating model updates obtained by the server from a pool of participating client devices. The aggregate model updates can be computed to satisfy a differential privacy metric, such that the contribution of any given device's individual model updates are below a noise floor.

Figure 2:
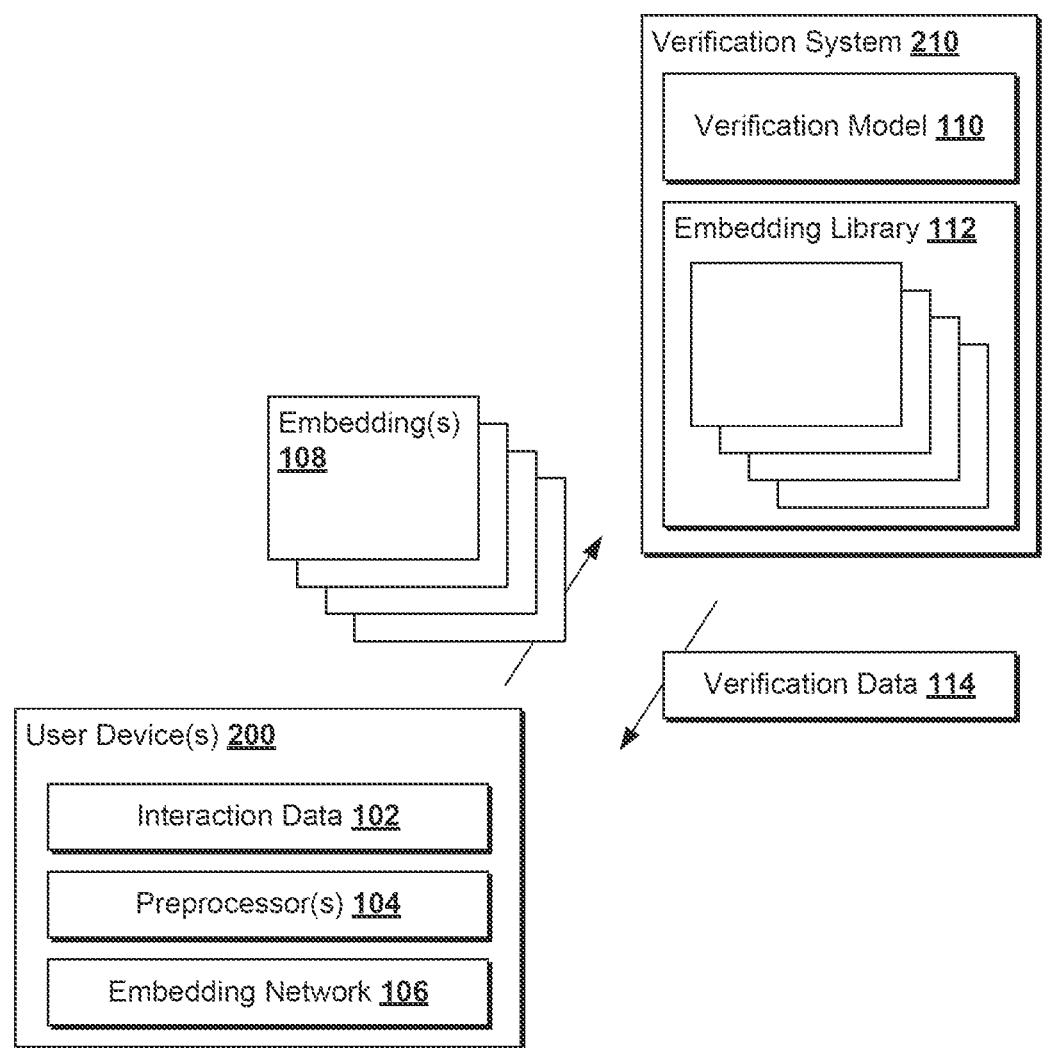
FIG. 2 is a block diagram of an example system configuration for implementing an example verification pipeline according to example aspects of some embodiments of the present disclosure.

FIG. 2 is a block diagram illustrating an example implementation of an example machine-learned verification pipeline 100 according to the present disclosure. One or more user device(s) 200 can generate embedding(s) 108 for input to a verification system 210 that returns verification data 110 based on comparison of the embedding(s) 108 with an embedding library 112. The embedding library 112 can be associated with user device(s) 200. The embedding library 112 can be only associated with user device(s) 200.

Verification system 210 can be implemented on or external to user device(s) 200. Verification system 210 can be implemented as a service running on user device(s) 200. Verification system 210 can be implemented as a runtime service of an operating system. Verification system 210 can be implemented in a browser application. Verification system 210 can be implemented as a service running on an external server that interacts with user device(s) 200 according to a client-server relationship. Verification system 210 can expose an application programming interface (API) to one or more applications operating on user device(s) 200 for inputting embedding(s) 108 and obtaining verification data 114.

Figure 3:
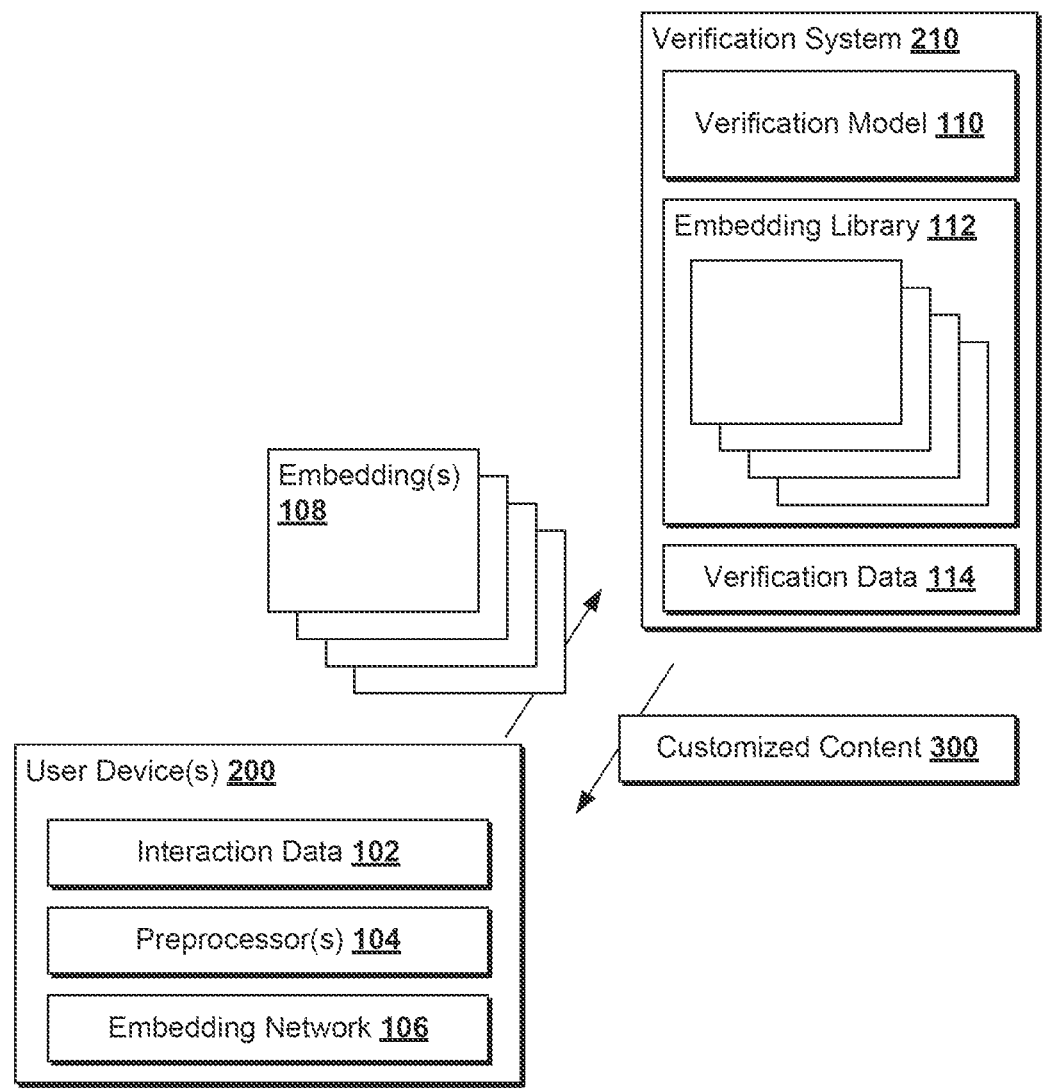
FIG. 3 is a block diagram of an example system configuration for implementing an example verification pipeline according to example aspects of some embodiments of the present disclosure.

FIG. 3 is a block diagram illustrating an example implementation of an example machine-learned verification pipeline 100 according to the present disclosure. One or more user device(s) 200 can generate embedding(s) 108 for input to a verification system 210 that returns customized content 300 based on comparison of the embedding(s) 108 with an embedding library 112.

Customized content 300 can be served to user device(s) 200 based on the determined user account. Customized content 300 can be selected from among other content based on the determined user account. Customized content 300 can be selected by real-time content arbitration among a plurality of content providers based on one or more characteristics of the determined user account (e.g., interests associated therewith).

Customized content 300 can include substantially any content selected or adapted based on the verification data 114. Customized content 300 can include an interface element configured to initiate retrieval of networked resources. Customized content 300 can include a hyperlink that directs a browsing interface to a web page hosting content over a network connection. Customized content 300 can include executable code. Executable code can include an application or a portion or snippet thereof. Customized content 300 can include interactive content or non-interactive content. Customized content 300 can include informational content.

Customized content 300 can be provided from verification system 210 to user device(s) 200. Customized content 300 can be provided from one or more other systems. Customized content 300 can be provided from a third-party content provider system. The third-party content provider system can receive, from verification system 210, one or more customization signals. The customization signals can be provided through an API accessible by the third-party content provider system. The customization signals can be noised for added privacy. One or more customization signals can include one or more feature values that indicate, to the third-party content provider system, how to customize the content for customized content 300. One or more customization signals can include a list of topics of interest associated with a user account (or other indexing value, such as a cluster identifier). Based on the list of the topics of interest, third-party content provider system can serve, to user device(s) 200, customized content 300.

Example Devices and Systems

Figure 4A:
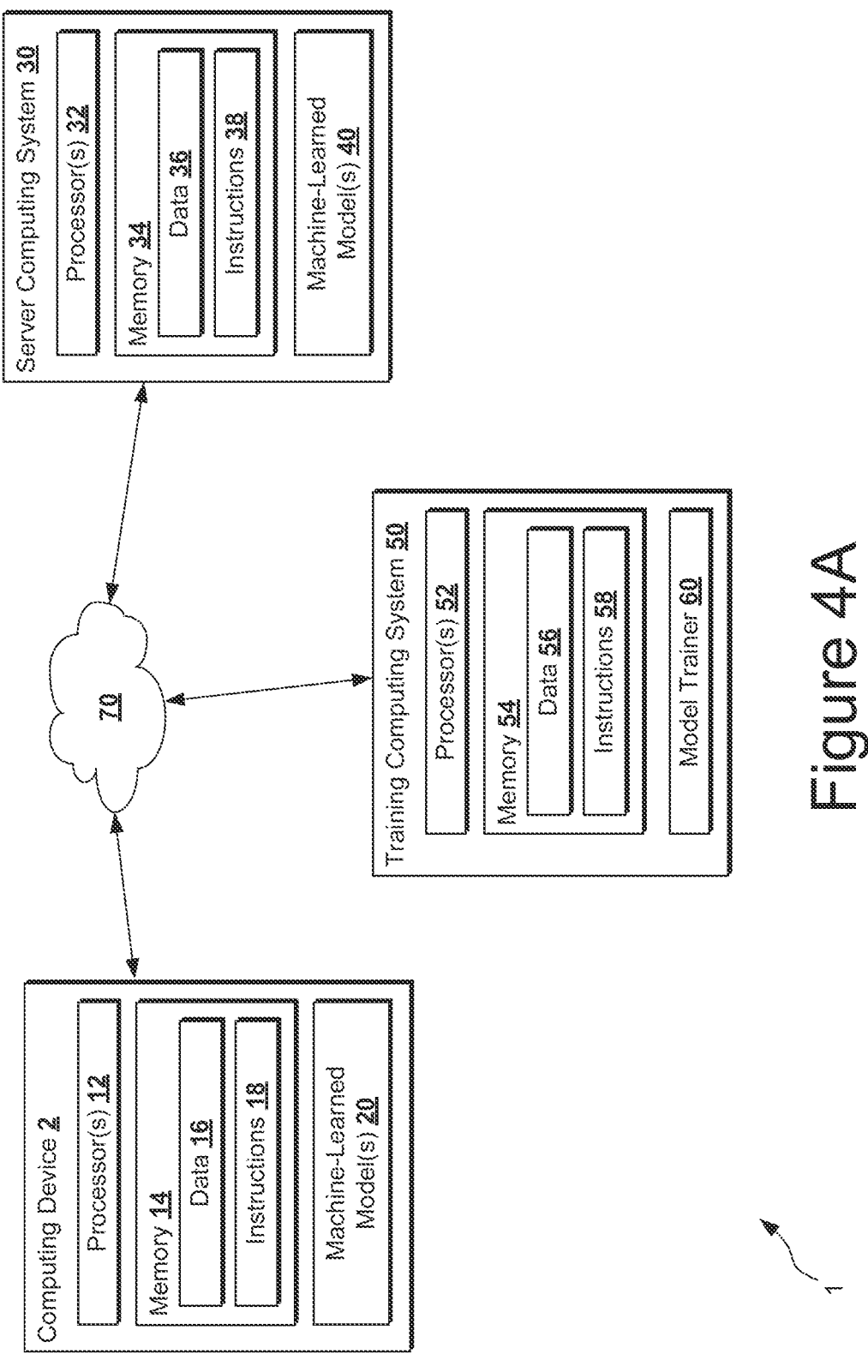
FIG. 4A is a block diagram of an example computing system for implementing an example verification pipeline according to example aspects of some embodiments of the present disclosure.

FIG. 4A depicts a block diagram of an example computing system 1 that can perform according to example embodiments of the present disclosure. The system 1 includes a computing device 2, a server computing system 30, and a training computing system 50 that are communicatively coupled over a network 70.

The computing device 2 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to perform operations implementing input data structures and self-consistency output sampling according to example embodiments of the present disclosure, etc.).

In some implementations, the user computing device 2 can store or include one or more machine-learned models 20. For example, the machine-learned models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, one or more machine-learned models 20 can be received from the server computing system 30 over network 70, stored in the computing device memory 14, and used or otherwise implemented by the one or more processors 12. In some implementations, the computing device 2 can implement multiple parallel instances of a machine-learned model 20.

Additionally, or alternatively, one or more machine-learned models 40 can be included in or otherwise stored and implemented by the server computing system 30 that communicates with the computing device 2 according to a client-server relationship.

The machine-learned models described in this specification may be used in a variety of tasks, applications, and/or use cases. The machine-learned models 20 and 40 can include one or more machine-learned models of the machine-learned verification pipeline 100.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some embodiments, the machine-learned models 40 can be implemented by the server computing system 30 as a portion of a web service (e.g., remote machine-learned model hosting service, such as an online interface for performing machine-learned model operations over a network on remote servers 30). For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 20 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations (e.g., to perform operations implementing input data structures and self-consistency output sampling according to example embodiments of the present disclosure, etc.).

In some implementations, the server computing system 30 includes or is otherwise implemented by one or more server computing devices. In instances in which the server computing system 30 includes plural server computing devices, such server computing devices can operate according to sequential computing architectures, parallel computing architectures, or some combination thereof.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The computing device 2 or the server computing system 30 can train example embodiments of a machine-learned model (e.g., including models 20 or 40) using a training pipeline (e.g., an unsupervised pipeline, a semi-supervised pipeline, a supervised pipeline, etc.). In some embodiments, the computing device 2 or the server computing system 30 can train example embodiments of a machine-learned model (e.g., including models 20 or 40) using a training pipeline by interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations (e.g., to perform operations implementing input data structures and self-consistency output sampling according to example embodiments of the present disclosure, etc.). In some implementations, the training computing system 50 includes or is otherwise implemented by one or more server computing devices.

The model trainer 60 can include a pipeline for training machine-learned models using various objectives. Model trainer 60 can be or include model trainer 130. Parameters of the image-processing model(s) can be trained, in some embodiments, using various training or learning techniques, such as, for example, backwards propagation of errors. For example, an objective or loss can be backpropagated through the training pipeline(s) to update one or more parameters of the model(s) (e.g., based on a gradient of the loss function). Various determinations of loss can be used, such as mean squared error, likelihood loss, cross entropy loss, hinge loss, contrastive loss, triplet loss, or various other loss functions. Gradient descent techniques can be used to iteratively update the parameters over a number of training iterations. In some implementations, performing backwards propagation of errors can include performing truncated backpropagation through time. The training pipeline can perform a number of generalization techniques (e.g., weight decays, dropouts, etc.) to improve the generalization capability of the models being trained.

The model trainer 60 can include computer logic utilized to provide desired functionality. The model trainer 60 can be implemented in hardware, firmware, or software controlling a general-purpose processor. For example, in some implementations, the model trainer 60) includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 4A illustrates one example computing system that can be used to implement the present disclosure. Other computing systems can be used as well. For example, in some implementations, the computing device 2 can include the model trainer 60. In some implementations, the computing device 2 can implement the model trainer 60 to personalize the model(s) based on device-specific data.

Figure 4B:
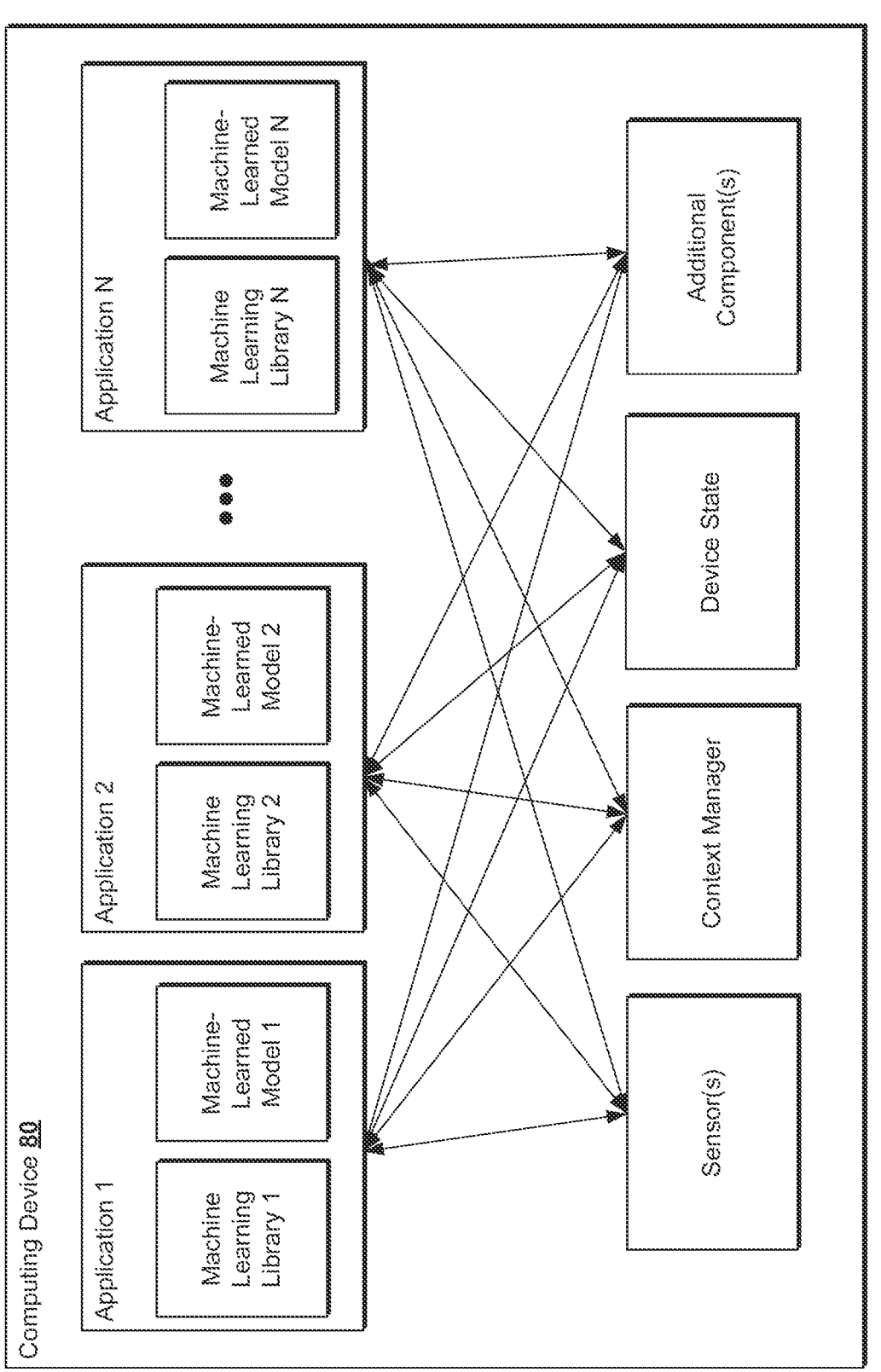
FIG. 4B is a block diagram of an example computing device for implementing an example verification pipeline according to example aspects of some embodiments of the present disclosure.

FIG. 4B depicts a block diagram of an example computing device 80 that performs according to example embodiments of the present disclosure. The computing device 80 can be a user computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 4B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 4C:
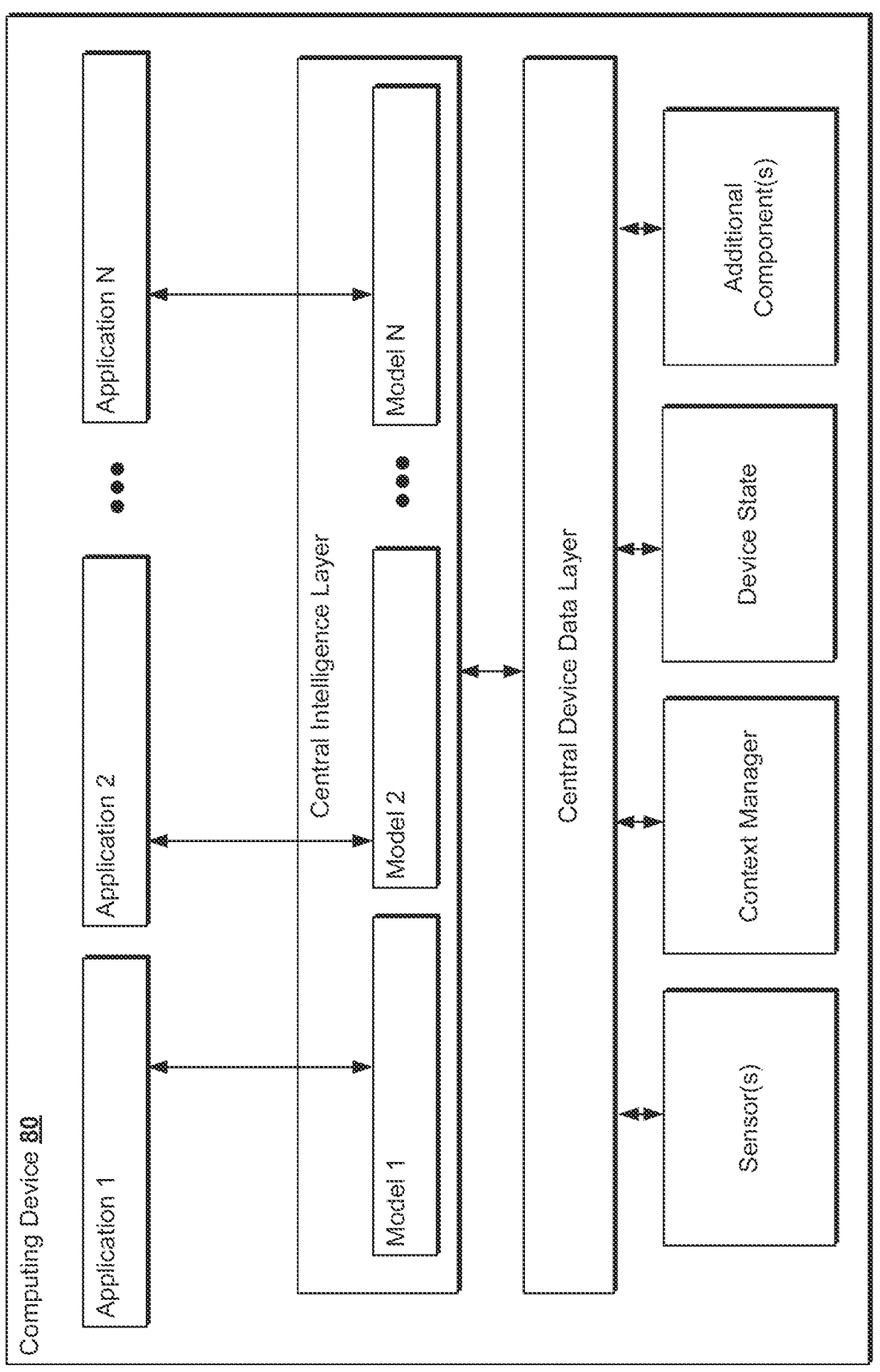
FIG. 4C is a block diagram of an example computing device for implementing an example verification pipeline according to example aspects of some embodiments of the present disclosure.

FIG. 4C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 4C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 4C, the central device data layer can communicate with a number of other components of the computing device, such as, for example, one or more sensors, a context manager, a device state component, or additional components. In some implementations, the central device data layer can communicate with each device component using an API (e.g., a private API).

FIG. 5 depicts a flow chart diagram of an example method 500 to perform according to example embodiments of the present disclosure. Although FIG. 5 depicts steps performed in a particular order for purposes of illustration and discussion, the methods of the present disclosure are not limited to the particularly illustrated order or arrangement. The various steps of example method 500 can be omitted, rearranged, combined, and/or adapted in various ways without deviating from the scope of the present disclosure.

At 502, example method 500 can include obtaining, by one or more sensors of a computing device, unverified interaction data descriptive of interactions of a user with the computing device. Unverified interaction data can include interaction data 102. Although example method 500 is described in the context of unverified interaction data, it is to be understood that verified interaction data can likewise be processed according to example method 500 (e.g., during a training iteration).

At 504, example method 500 can include generating, using a machine-learned embedding network of the machine-learned verification pipeline, feature values that embed characteristics of the unverified interaction data. Such feature values can be or include embedding(s) 108. The machine-learned embedding network can be or include embedding network 106.

At 506, example method 500 can include determining, using a verification model of the machine-learned verification pipeline, and based on the feature values, a user account associated with the unverified interaction data. The verification model can be or include verification model 110. Although example method 500 is described in the context of determining a user account, it is to be understood that implementations of example method 500 can be used to determine one or more proxies of a user account, such as a cluster identifier of a cluster of embeddings. Using example method 500, different sessions for different users can be disambiguated, even if user account data is not available or does not exist. For instance, a shared computing device can be used by multiple users over a period of time in a number of sessions for each user. One or more embeddings can be generated using the machine-learned verification pipeline 100 for each session. The embeddings can be clustered in an embedding library. Future interaction data for a future session can be verified by comparing a new embedding for that session against the clusters in the embedding library. Thus the future session can be associated with prior sessions. User account data may or may not be determined.

Example method 500 can include initiating a prompt for rendering by the computing device to request confirmation, from the user, of the determined user account. The prompt can be rendered graphically (e.g., a graphical user interface element on a display device) or audibly (e.g., a verbal prompt for confirmation that can be provided verbally or with other input).

In example method 500, the prompt can form part of an initialization procedure. For instance, an initialization procedure can be required when setting up a new device, setting up a new user account, on boot, etc.

Confirmation can be used to generate ground truth interaction data 122. Confirmation can be used to transform unverified interaction data 102 into ground truth interaction data 122. Confirmation can be used to automatically associate future interaction data 102 with the corresponding user account.

Example method 500 can include updating one or more parameters of the machine-learned verification pipeline based on the confirmation. Model trainer 130 can process ground truth interaction data 122 and ground truth verification data for performing one or more model updates.

Example method 500 can include generating, using the machine-learned feature extraction model, updated feature values based on an updated portion of unverified interaction data. As a user uses a computing device, for example, the machine-learned verification pipeline can continuously or periodically verify and re-verify the interaction data for the session. An update portion of interaction data can include a portion that has not yet been processed by verification pipeline 100.

Example method 500 can include determining, using the verification model of the machine-learned verification pipeline, and based on the updated feature values, a user account associated with the updated portion. In example method 500, the updated portion can be obtained using a sliding window over a time history of interactions. A time history can be maintained in a buffer (e.g., a rolling buffer).

In example method 500, the determining the user account associated with the unverified interaction data can include comparing the feature values against a reference library comprising one or more verified embeddings associated with the user account.

In example method 500, the determining the user account associated with the unverified interaction data can include determining a distance between the feature values and the one or more verified embeddings.

In example method 500, the determining the user account associated with the unverified interaction data can include comparing the feature values against a reference set of feature values, the reference set comprising one or more clustered embeddings. In example method 500, the determining the user account associated with the unverified interaction data can include determining an association with the user account based on a distance between the feature values and the one or more clustered embeddings.

In example method 500, the interaction data can be collected as the user navigates software interfaces rendered by the computing device. For instance, interaction data 102 can be recorded in the background. Interaction data 102 can be recorded by an operating system service of a user device. Interaction data 102 can be recorded by a secure service that operates in a secured enclave or sandbox. Other applications operating on the user device can be shielded from accessing interaction data 102.

In example method 500, the one or more sensors can include a touch-sensitive display interface. In example method 500, the one or more sensors can include an audio sensor. In example method 500, the unverified interaction data can include locations or times of inputs received by the one or more sensors. In example method 500, the unverified interaction data can include translations or rotations of the computing device.

Example method 500 can include rendering content selected based on the determined user account. In example method 500, the content can be selected by real-time content arbitration among a plurality of content providers. In example method 500, the content can include an interface element configured to initiate retrieval of networked resources. In example method 500, the interface element can include a hyperlink.

In example method 500, the networked resources can include executable code. In example method 500, the executable code can include an app snippet. In example method 500, the networked resources can include informational content. The networked resources can include web content, such as web pages, links to web pages, images, videos, animations, text, etc.

In example method 500, the computing device can be associated with multiple user accounts. The computing device can be associated with multiple users that may or may not each have a user account. In example method 500, the computing device can be configured to operate multiple user sessions respectively with the multiple user accounts. In example method 500, the computing device can be configured to operate the multiple user sessions without requiring a sign-in for each session.

Example method 500 can include obtaining, during a second session, second unverified interaction data from interactions of a second user. Example method 500 can include generating, second the machine-learned feature extraction model, second feature values that embed characteristics of the first unverified interaction data. Example method 500 can include associating, using the verification model and based on the second feature values, the second session with a second user account associated with the second user. In example method 500, the second user may not be required to sign in after the user.

In example method 500, the computing device can determine a respective user account associated with a respective session in the background during the respective session.

In example method 500, one or more parameters of the machine-learned verification pipeline can be trained based on prior inputs to the computing device. In example method 500, one or more parameters of the machine-learned verification pipeline can be trained based on prior inputs to a different computing device associated with the user account. In example method 500, the prior inputs can include verified interaction data.

In example method 500, the verified interaction data can be verified based on a sign-on procedure associated with unlocking an interface of the different computing device. In example method 500, the different computing device can be a mobile device, such as a phone.

In example method 500, the machine-learned verification pipeline can perform image-based processing of the unverified input data. In example method 500, the machine-learned verification pipeline can process a map of input locations. In example method 500, the machine-learned verification pipeline can include a convolutional neural network.

In example method 500, the machine-learned verification pipeline can perform sequence-based processing of the unverified input data. In example method 500, the machine-learned verification pipeline can include a transformer model.

In example method 500, the machine-learned verification pipeline can include an encoder and a decoder. In example method 500, the encoder can include the machine-learned feature extraction model and the decoder can include the machine-learned verification model.

In example method 500, the encoder can be implemented on a first computing device and the decoder can be implemented on a second computing device.

In example method 500, the unverified interaction data can be noised prior to processing by the machine-learned verification pipeline.

In example method 500, the machine-learned verification pipeline can provide, via an API, account verification as a service to one or more applications executing on the computing device.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the

21

scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Also, terms such as "based on" should be understood as "based at least in part on."

What is claimed is:

1. A computer-implemented method for verification of sensor inputs with a machine-learned verification pipeline, the method comprising:

obtaining, by one or more sensors of a computing device during a first session on the computing device, unverified interaction data descriptive of interactions of a user with the computing device;

generating, using a machine-learned embedding network of the machine-learned verification pipeline, feature values that embed characteristics of the unverified interaction data;

determining, using a verification model of the machine-learned verification pipeline, and based on the feature values, a user account associated with the unverified interaction data;

associating, by the computing device, the first session on the computing device with the user account;

obtaining, by the computing device during a second session on the computing device, second unverified interaction data from interactions of a second user;

generating, by the machine-learned embedding network, second feature values that embed characteristics of the second unverified interaction data; and associating, using the verification model and based on the second feature values, in the background during the second session, the second session on the computing device with a second user account associated with the second user.

2. The method of claim 1, comprising:

initiating a prompt for rendering by the computing device to request confirmation, from the user, of the determined user account.

3. The method of claim 2, comprising:

updating one or more parameters of the machine-learned verification pipeline based on the confirmation.

4. The method of claim 1, wherein the determining the user account associated with the unverified interaction data comprises:

comparing the feature values against a reference library comprising one or more verified embeddings associated with the user account.

5. The method of claim 1, wherein the determining the user account associated with the unverified interaction data comprises:

comparing the feature values against a reference set of feature values, the reference set comprising one or more clustered embeddings; and determining an association with the user account based on a distance between the feature values and the one or more clustered embeddings.

22

6. The method of claim 1, comprising:

rendering, by the computing device, content selected based on the determined user account.

7. The method of claim 6, wherein the content is selected by real-time content arbitration among a plurality of content providers.

8. The method of claim 1, wherein the computing device is associated with multiple user accounts;

wherein the computing device is configured to operate multiple user sessions respectively with the multiple user accounts; and wherein the computing device is configured to operate the multiple user sessions without requiring a sign-in for each session.

9. The method of claim 1, wherein one or more parameters of the machine-learned verification pipeline was trained based on prior inputs to a different computing device associated with the user account.

10. The method of claim 9, wherein the prior inputs were verified based on a sign-on procedure associated with unlocking an interface of the different computing device.

11. The method of claim 1, wherein the machine-learned verification pipeline performs image-based processing of the unverified interaction data.

12. The method of claim 1, wherein the machine-learned verification pipeline performs sequence-based processing of the unverified interaction data.

13. The method of claim 1, wherein the machine-learned verification pipeline processes a map of input locations.

14. The method of claim 1, wherein the machine-learned verification pipeline comprises a transformer model.

15. The method of claim 1, wherein the machine-learned verification pipeline comprises a convolutional neural network.

16. The method of claim 1, wherein the machine-learned verification pipeline comprises an encoder and a decoder, and wherein the encoder comprises the machine-learned embedding network and the decoder comprises the verification model.

17. The method of claim 1, wherein the machine-learned verification pipeline provides, via an API, account verification as a service to one or more applications executing on the computing device.

18. A computer-implemented method for verification of sensor inputs with a machine-learned verification pipeline, the method comprising:

obtaining, by a plurality of sensors of a computing device, unverified interaction data descriptive of interactions of a user with the computing device, wherein the plurality of sensors record interaction data at different data resolutions;

merging the unverified interaction data into a multidimensional input format that indexes data from the plurality of sensors over a plurality of time steps at a shared data resolution;

inputting the merged unverified interaction data to a machine-learned embedding network of the machine-learned verification pipeline;

generating, using the machine-learned embedding network of the machine-learned verification pipeline, feature values that embed characteristics of the unverified interaction data; and determining, using a verification model of the machine-learned verification pipeline, and based on the feature values, a user account associated with the unverified interaction data.

19. A computing device, comprising:

a plurality of sensors;

one or more processors; and a memory device comprising one or more non-transitory computer-readable media storing:

a machine-learned verification pipeline comprising:

a machine-learned embedding network configured to receive a multidimensional input format that indexes data from the plurality of sensors over a plurality of time steps at a shared data resolution; and a verification model;

instructions that are executable to cause one or more processors to perform operations comprising:

obtaining, from the plurality of sensors, unverified interaction data descriptive of interactions of a user with the computing device, wherein the plurality of sensors record interaction data at different data resolutions;

merging the unverified interaction data into the multidimensional input format;

inputting the merged unverified interaction data to the machine-learned embedding network;

generating, using the machine-learned embedding network, feature values that embed characteristics of the unverified interaction data; and determining, using the verification model and based on the feature values, a user account associated with the unverified interaction data.

20. The method of claim 1, wherein the computing device associates the second session on the computing device with the second user account associated with the second user without requiring explicit confirmation from the second user.

21. The method of claim 1, wherein the feature values correspond to a plurality of image frames in a buffer representing snapshots of user interactions over time.

* * * * *